United States Patent [19]

Ueno

[11] Patent Number: 4,732,174
[45] Date of Patent: Mar. 22, 1988

[54] SPOOL-TYPE FLOW ADJUSTING VALVE
[75] Inventor: Toyoaki Ueno, Yamaguchi, Japan
[73] Assignee: Ube Industries, Ltd., Yamaguchi, Japan
[21] Appl. No.: 766,631
[22] Filed: Aug. 16, 1985
[30] Foreign Application Priority Data Aug. 28, 1984 [JP]  Japan .................. 59-177566

[51] Int. Cl.$^4$ ............................................. F16K 31/04
[52] U.S. Cl. .......................... 137/625.38; 251/129.11
[58] Field of Search ............... 137/625.38; 251/129.11

[56] References Cited
U.S. PATENT DOCUMENTS 2,130,614  9/1938  Collins et al. .
2,672,158  3/1954  Cormany ........................... 251/282

FOREIGN PATENT DOCUMENTS 812178   8/1951  Fed. Rep. of Germany .
1950915  4/1966  Fed. Rep. of Germany .
1087730  2/1955  France .
2112908A 7/1983  United Kingdom .

Primary Examiner—Gerald A. Michalsky
Attorney, Agent, or Firm—Burgess, Ryan and Wayne

[57] ABSTRACT

A spool-type flow adjusting valve, for use in a die casting machine, including a valve bore and a valve spool slidably positioned therein. The spool is driven to axially reciprocate by a pulse motor by means of a transmission of a ball-screw type. The bore forms first and second chambers divided by the spool and has a flow inlet and a flow outlet, while the spool has an axial rod extending through the second chamber to the transmission and has one or more through-holes communicating the first and second chambers and a circumferential groove communicating with the through-holes. When the valve is opened, two flow passages are formed in the valve communicating the flow inlet and outlets, one through the first chamber and the other through the first chamber, the through-holes and the groove. The ratio of cross-sectional areas of the through-holes in total to the cross-sectional area of the spool is set to a value large enough to have a thrust acting on the spool in the direction of valve opening decreased as the degree of valve opening is increased from zero and have a direction of the thrust changed at a specific degree from the valve opening direction to the valve closing direction. When an abnormal accident, where the spool is free from control of positioning the spool, occurs during the casting operation, the spool is forced to return automatically to the specific degree by the resultant thrust.

15 Claims, 4 Drawing Figures

SPOOL-TYPE FLOW ADJUSTING VALVE

BACKGROUND OF THE INVENTION

1. Field of the Invention

The present invention relates to a spool-type flow adjusting valve, preferably to be used in a die casting machine, which valve works effectively to adjust the flow rate in a hydraulic circuit and to switch an injection operation from low speed to high speed.

2. Description of the Related Art

In the die casting machine, melt is generally injected into the cavity of a metal mold from an injection cylinder at a low speed in the initial stage and at a high speed in the middle stage. The injection of the melt into the die casting machine is usually conducted by drive control of the injection cylinder, which is actuated by hydraulic pressure. To improve the quality of the molded products, low-speed injection must be switched to high-speed injection as quickly as possible and the injection speeds during the low-speed injection and the high-speed injection must be maintained as stably as possible.

In order to automatically adjust the flow rate to some degree, electromagnetic flow adjusting valves of the spool type have heretofore been employed. Electromagnetic flow adjusting valves control the flow rate in proportion to the input current and are equipped with differential transformers to move pilot spools in proportion to a current supplied to the differential transformers. Electromagnetic flow adjusting valves are further interlocked to main spools, so that the flow rate is maintained at a setpoint value. Electromagnetic flow adjusting valves are suitable for adjusting the flow rate to a desired value, but have no means to stop the main spool at a preset position. Therefore, upon receipt of an external force, the main spools move back and forth in the axial direction with the preset position as a center, whereby the flow rate undergoes variation and the injection speed of the die casting machine is not maintained constant.

In recent years, on the other hand, it has been demanded to arbitrarily set a pattern of injection speed to meet the metal mold in order to further improve the quality of the molded products. With the conventional flow adjusting valves of the spool type, however, the screw shaft is manually operated to set a flow rate. Therefore, it was impossible to arbitrarily set a pattern of injection speed. For this purpose also, electromagnetic flow adjusting valves of the spool type have also heretofore been used. In the electromagnetic flow adjusting valves of this type, however, the fact that the valve spools are actuated utilizing magnetic force makes it very difficult to precisely and quickly switch a small flow rate of, for example, 10 to 20 liters a minute to a large flow rate of, for example, 50 to 100 liters a minute with a maximum of 15,000 liters a minute, with a single flow adjusting valve. Therefore, when electromagnetic flow adjusting valves of this type are adapted to a hydraulic circuit for driving the injection cylinder, separate valves must be provided for the small flow rate and for the large flow rate along with a switch valve.

Therefore, conventional electromagnetic flow adjusting valves of this type have not been able to satisfy such requirements as quick switching of injection speed, stable injection speed during the moment of switching, and simplicity of the hydraulic circuit. Accordingly, they have not been well suited for highspeed injection application, which requires stable injection speed and speed changes after short periods of time.

Further, even small amounts of foreign matter which are contained in the operating oil and which adhere on the pilot spool cause its movement to be changed and the flow rate to be changed.

Moreover, when the hydraulic circuit is switched, there develops shock in the hydraulic pressure due to the change of pilot lines and change of valves, to disturb operation of the main spool which has no means for mechanically anchoring it at the present position. Accordingly, it becomes difficult to accurately adjust the flow rate. This adversely affects the injection and the quality of the injection-molded products.

According to the conventional art, furthermore, a total of four valves were necessary; i.e., a switch valve for low-speed injection, a flow adjusting valve, a switch valve for high-speed injection, and a flow adjusting valve. Therefore, the hydraulic circuit tended to become complicated, requiring cumbersome control operation.

In connection with the above, it is noted that a flow adjusting valve of the spool type has heretofore been used in which one end of a cylinder chamber or a valve bore formed in the valve body serves as an inlet port for introducing the fluid that is to be controlled, and the opening degree of an outlet path formed in a side portion of the cylinder chamber is adjusted by moving the valve spool which is slidably provided in the cylinder chamber in the axial direction. However, in the conventional flow adjusting valve of this type in which the valve spool slides in direct contact with the inner surface of the valve body, the cylinder chamber must be formed in the valve body requiring highly precise machining, which is difficult to accomplish. Further, since it is difficult to absorb misalignment of axis between the cylinder chamber of the valve body and the valve spool, excessive force is exerted on the valve spool or on the driving portions, making it difficult to smoothly move the valve spool.

Under the above prior art circumstances, the present inventor made the invention disclosed in Japanese patent and U.M. applications, published unexamined under the Numbers: No. 58-102878 (U.M.), No. 59-89869 (Pat.) and No. 59-89870 (Pat.), and also is described in the corresponding U.S. patent application Ser. No. 455,512, now U.S. Pat. No. 4,586,539, and United Kingdom Patent Application of which publication No. is GB No. 2112908A.

According to that prior invention, there was provided a single flow adjusting valve of the spool type in place of the conventional plural valves incorporated in a single hydraulic conduit line in the die casting machine and eliminating the defects inherent in the conventional art.

The single flow adjusting valve has advantages in the following matters.

First, the valve is capable of precisely, quickly, and automatically adjusting the flow rate and in which the single valve works as both a flow adjusting valve and a switch valve for low-speed and high-speed injection. Second, it enhances the performance of switching of the flow rate at high speeds by reducing the required driving force. Third, it prevents the accuracy for adjusting the flow rate from being decreased by external force or by change in temperature.

The above mentioned spool-type flow adjusting valve comprises: a valve body having a flow inlet and a flow outlet for transferring a pressurized fluid within the valve; a valve bore formed within the valve body to communicate with the flow inlet and the flow outlet and having first and second chambers at opposite ends of the valve bore, the flow inlet being connected to the first chamber; a valve spool slidably positioned within the valve bore to divide the valve bore into the first and second chambers and maintaining frictional engagement with the valve bore, the valve spool having a cylindrical rod for slidably positioning the valve spool along the axis of the rod between the first and second chambers, the surface area of the valve spool facing the first chamber being greater than the surface area of the valve spool facing the second chamber, the opening and closing of the flow outlet being dependent upon the reciprocating movement of the valve spool within the valve bore; means for slidably positioning the cylindrical rod; and at least one flow passage formed within the valve spool for interconnecting the first and second chambers, the flow passage being defined by a through-hole formed along the length of the valve spool. The flow of the fluid passing between the flow inlet and the flow outlet increases as the valve spool moves in the direction of the second chamber and opens the flow outlet.

The spool-type flow adjusting valve further includes a groove between the outer surface of the valve spool adjacent to the valve bore to open to the flow passage, for allowing the fluid to flow from the flow passage into the flow outlet when the groove is aligned with the flow outlet. The flow outlet includes first and second channels extending substantially perpendicular to the axis of the valve spool. The first channel is in fluid communication with the first chamber, and the second channel is in fluid communication with the flow passage when the groove is aligned with the second channel.

The means for slidably positioning the cylindrical rod includes: a housing mounted adjacent to the second chamber, the adjacent surfaces of the second chamber and the housing having receiving means coaxially aligned with the cylindrical rod; a connecting shaft slidably supported within the shaft receiving means and having a rod portion and a cylindrical portion, the rod portion being connected to the valve spool; motor means including a pulse motor having a driving member and a driven member mounted within the housing for imparting rotational movement within the housing; conversion means connecting the cylindrical portion of the connecting shaft to the driven member for transforming rotational movement into reciprocating movement, the conversion means including a nut attached to the cylindrical portion, a screw drive shaft connected to the driven member for rotation within the nut, balls rotatably positioned between the nut and the screw drive shaft and means for preventing the nut from rotating relative to the housing.

The spool-type flow adjusting valve is used in a die casting machine comprising an injection cylinder for activating a plunger by pressurized oil, a pressurized oil source, a single hydraulic passage through which the oil is supplied from the oil source to the injection cylinder, so that the single passage includes the spool-type flow adjusting valve therein in such arrangement that upstream and downstream portions of the single passage communicate with the flow inlet and the flow outlet of the valve, respectively, whereby the injection operation is switched from low speed injection to high speed injection.

The above spool-type flow adjusting valve used in the die casting machine, can be designed so that a thrust acting on the valve spool due to the pressurized oil behaves in the following manner. The thrust is in a valve opening direction when the degree of valve opening is zero and it is abruptly decreased as the valve opening degree is increased from zero to a certain degree. It is then increased as the degree is further increased. According to one design, the thrust is kept in a valve opening direction at any valve opening degree. However, according to another design, a direction of the thrust is changed from the valve opening direction to the valve closing direction at a certain degree of the valve opening.

Such alternative thrust behavior is advantageous in promoting or accelerating the valve opening movement of the spool to the effect that the valve is switched to have the flow rate of the oil from a low speed injection region (i.e., a small degree of valve opening) such as 0.1 to 0.2 m/sec to a high speed injection region (i.e., a large degree of valve opening) such as 1 to 5 m/sec) during a short period of time, e.g., 0.05 sec. In this case, it is desired that an absolute value of the thrust (in a direction of valve opening or closing) be as low as possible. This is because, otherwise, in the case of an increased valve capacity such as 50 to 15000 l/min, an extra and large force loaded by the driving and transmission mechanism is required to maintain the spool at a position where a desired high flow rate or high speed injection is obtained. The thrust not in the valve opening direction but in the valve closing direction at a high speed injection region appears to be more preferable, because such thrust exerts a braking force when the spool is going to stop. However, in a general evaluation, such a thrust in the valve opening direction is not always advantageous more than that of a thrust in the valve opening direction at the high speed injection region in that a period of time from the starting at the low speed injection region to the stopping at the high speed injection region is decreased while requiring a reduced driving force to move the spool.

In connection with this, it has been noted that even in the above mentioned other design to produce a thrust of the spool in the valve closing direction at the high speed injection region, the direction of such thrust changes from the valve closing direction to the valve opening direction if the spool is forced to move further toward the valve opening direction.

As explained above, the spool-type flow adjusting valve is advantageous in exhibiting high-speed performance for switching the flow rate, while requiring reduced driving force.

However, the inventor recently has found that, in using such flow adjusting valves, there is the following problem.

When an abnormality occurs in operation, where the load torque becomes greater than the motor torque, the supply of power is interrupted due to power failure or the spool shaft happens to break for some reason, the flow rate of pressurized oil flowing into the injection cylinder abnormally increases with the result that the flow adjusting valve, the driving means, and/or the die casting machine is damaged. Such a result is dangerous to the operator involved.

SUMMARY OF THE INVENTION

It is an object of the present invention to provide an improved spool type flow adjusting valve, preferably for use in a die casting machine, with safety performance remarkably enhanced against such an abnormal conditions which may occur in a casting operation.

According to the present invention, there is provided an improvement in the spool-type flow adjusting valve according to the prior invention made by the present inventor. The improvement resides in that the ratio of cross-sectional areas of the flow passages or the through-holes in total to cross-sectional area of the spool is designed to be large enough to have a thrust acting on the valve spool in the direction of valve opening decreased as the degree of valve opening is increased from zero and have a direction of thrust changed at a specific degree from the valve opening direction to the valve closing direction, wherein, when the valve spool is free from control for positioning the spool at a desired degree of valve opening over the specific degree in operation, the valve spool is forced to return to the specific degree by the resultant thrust in the valve closing direction.

Preferably, the improved flow adjusting valve is provided with axial spring means or biasing means in the second chamber between the valve spool and the housing for exerting a resilient or biasing force against the valve spool, whereby the thrust of the valve spool is maintained in the valve closing direction while the valve spool is positioned at any degree of valve opening over the specific degree.

Further, the improved flow adjusting valve is provided preferably with an adjusting disk for partially covering the through-holes, mounted to the valve spool coaxially at the end thereof facing the first chamber, in a case where a plurality of the through-holes are located along a circle having a center at the axis of the valve spool. The disk is used for adjusting the cross-sectional area of each through-hole.

BRIEF DESCRIPTION OF THE DRAWINGS

The present invention can be more fully understood from the following detailed description with reference to the accompanying drawings, in which:

FIG. 4 is a front view of the valve spool modified from that of FIG. 1.

DESCRIPTION OF THE PREFERRED EMBODIMENTS

Figure 1:
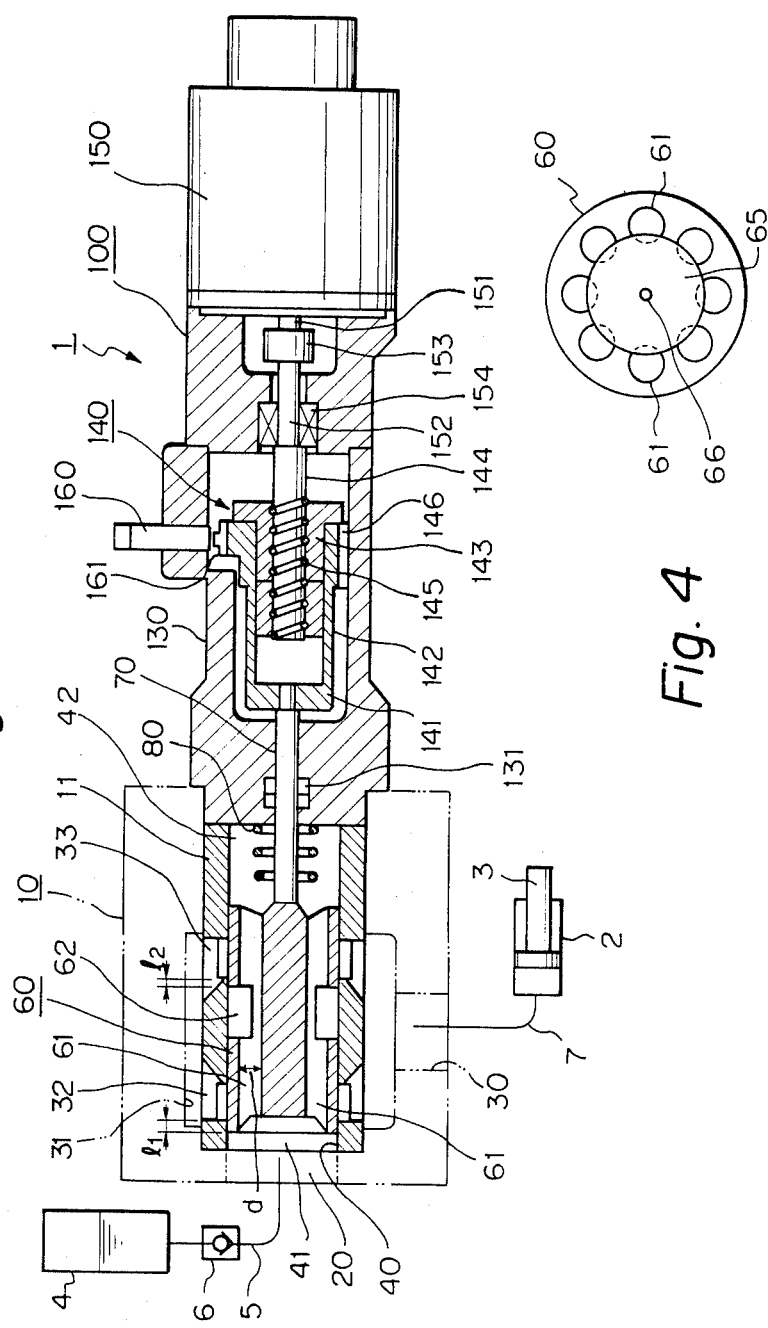
FIG. 1 is a longitudinally sectional view of an embodiment of the valve according to the present invention.

Referring to FIG. 1, a spool-type flow adjusting valve 1 of the present invention is used in a die casting machine comprising an injection cylinder 2 having an injection plunger 3 therein, an oil accumulator 4 which stores the pressurized oil, an upstream conduit line 5 equipped with a pilot check valve 6 and connecting with the accumulator 4, and a downstream conduit line 7 connecting with the injection cylinder 2. The valve 1 is connected with the upstream conduit line 5 at a flow inlet 20 of the valve, and is connected with the downstream conduit line 7 at a flow outlet 30 of the valve.

The valve 1 comprises a valve body 10 having the flow inlet 20 and the flow outlet 30 for transferring the oil within the valve. The valve body 10 has an axial hollow formed therein and a cylindrical sleeve 11 attached to the surface of the hollow. A valve bore 40 is defined by the sleeve 11 and the hollow in combination to communicate with the flow inlet 20 and the flow outlet 30. The valve bore 40 has a first or front chamber 41 and a second or rear chamber 42 at opposite ends. The flow inlet 20 is connected to the front chamber 41. A valve spool 60 is slidably positioned within the valve bore 40 to separate the front chamber 41 and the rear chamber 42 from each other and maintains frictional engagement with the valve bore 40. The valve spool 60 has a cylindrical rod 70 for slidably positioning the valve spool 60 along the axis of the rod 70 between the front and rear chambers 41 and 42. The surface area of the valve spool 60 facing the front chamber 41 is greater than that of the valve spool facing the rear chamber 42. The opening and closing of the flow outlet 30 is dependent upon the reciprocating movement of the valve spool 60 within the valve bore 40. A plurality of flow passage 61 are formed in the valve spool 60 for interconnecting the front chamber 41 and the rear chamber 42. The flow passages 61 are defined by axial through-holes formed in an equiangular arrangement along the length of the valve spool 60. the through-holes are preferably proximate the periphery of the valve spool 60. The flow of the oil passing between the flow inlet 20 and the flow outlet 30 increases as the valve spool 60 moves in the direction of the second or rear chamber 42 and opens the flow outlet 30. This direction is referred to as "the direction of valve opening", while the opposite direction is referred to as "the direction of valve closing".

A circumferential groove 62 is formed at the outer surface of the valve spool 60 adjacent to the valve bore 40 to open to the flow passages or through-holes 61 for allowing the fluid of the oil to flow therefrom into the flow outlet 30 when the circumferential groove 62 of the valve spool is aligned with the flow outlet 30. The flow outlet 30 includes a first or front channel 32 and a second or rear channel 33 and an annular groove 31 connecting the two channels with the flow outlet 30. The front and rear channels are formed in the sleeve 11 and extend substantially perpendicular to the axis of the valve spool 60. The annular groove 31 is formed at the inner surface of the valve body 10 preferably with the axis deflected from the axis of the valve bore 40 toward the flow outlet 30, and is covered by the sleeve 11. The first chamber 41 is in fluid communication with the flow outlet 30 through the front channel 32 and the annular groove 31, and also is in fluid communication with the flow outlet 30 via the through-holes 61, the circumferential groove 62, the rear channel 33 and the annular groove 31, when the circumferential groove 62 of the valve spool 60 is aligned with the rear channel 33.

A device for slidably positioning the cylindrical rod 70 is provided, which comprises a cylindrical housing 130 mounted adjacent to the rear chamber 42. The housing 100 includes a casing 130 which has packing or sealing members 131 therein. The casing 130 is coaxially aligned with the cylindrical rod 70. A connecting shaft 140 is slidably supported within the casing 130 and has a rod portion 141 and a cylindrical portion 142. The rod portion 141 is connected to the valve spool 60 by means of the cylindrical rod 70. A pulse motor 150 has a driving member including a motor shaft 151 and a driven member including a driven shaft 152 mounted within the housing 100 by means of a bearing 154 for imparting rotational movement within the housing 100. The motor shaft 151 and the driven shaft 152 are connected by a coupling 153.

A conversion mechanism, connecting the cylindrical portion 142 of the connecting shaft 140 to the driven shaft 152, is provided for transforming rotational movement provided by the motor shaft 151 into axial reciprocating movement.

The conversion mechanism includes a nut 143 attached to the cylindrical portion 142 therein, a screwed drive shaft 144 connected to the driven shaft 152 for rotation within the nut 143, and means for preventing the nut 143 from rotating relative to the housing 100. The preventing means includes a key or lug 146 extending from the nut 143 into a slot formed by the housing and extending a predetermined distance substantially parallel to the axis of the screwed drive shaft 144. The lug is slidable within the slot. Balls 145 are rotatably positioned between the nut 143 and the screwed drive shaft 144.

The conversion mechanism includes a sensor having a magnetic element 161 affixed to the casing 140 and a position detector 160, mounted to the housing 100, including a contactless switch means for detecting the position of the magnetic element 161. The switch means provides feedback to the pulse motor 150 for controlling the axially sliding movement of the valve spool 60.

Numeral 80 in FIG. 1 denotes a helical spring encircling the rod 70 and is disposed between the valve spool 60 and the housing 100 in the rear chamber 42, so that the spring exerts a resilient or biasing force against the valve spool in the direction of valve closing, when it is compressed.

Alternatively, a spring such as that of 70 may be provided between the connecting shaft 140 and the motor 150 in the housing 100, encircling the screw drive shaft 144. This arrangement is convenient in that the spring can be replaced without overhauling the valve arrangement comprising the valve body 10 and the valve spool 60. Therefore, it is not necessary to drain the oil in the valve bore 10 and the valve spool 60.

Figure 2:
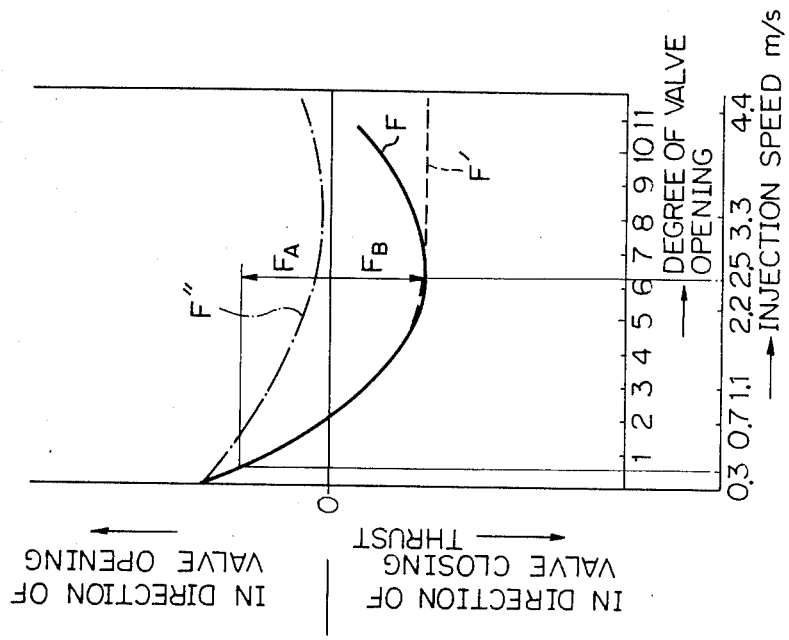
FIG. 2 is a diagram of the relation between thrust elements, generated to act on the valve spool by the fluid to be controlled in the valve of the present invention, and the opening amount of the valve spool or the injection speed.

According to the above mentioned valve used in the die casting machine, the pressurized oil produces three kinds of thrust elements $F_0$, $F_1$ and $F_2$ acting on the valve spool as indicated in FIG. 2. The thrust element $F_0$ is generated due to a static pressure differential produced at the opposing surfaces of the valve spool 60. The thrust element $F_0$ is in the direction of valve opening but is decreased gradually as the degree of valve opening is increased.

The thrust element $F_1$ is generated due to the dynamic pressure of the oil flowing into the front chamber 41 when the valve opens the flow outlet 30. The thrust element $F_1$ is in the direction of valve opening and is increased gradually as the degree of valve opening is increased.

The thrust element $F_2$ is generated due to throttling of the oil fluid at the front channel 32 and the rear channel 33 and is in the direction of valve closing. The thrust element $F_2$ is increased from zero in the direction of valve closing as the degree of valve opening is increased from zero toward a specific value, and then is decreased from the maximum value as the degree is increased further from the specific one.

Figure 3:
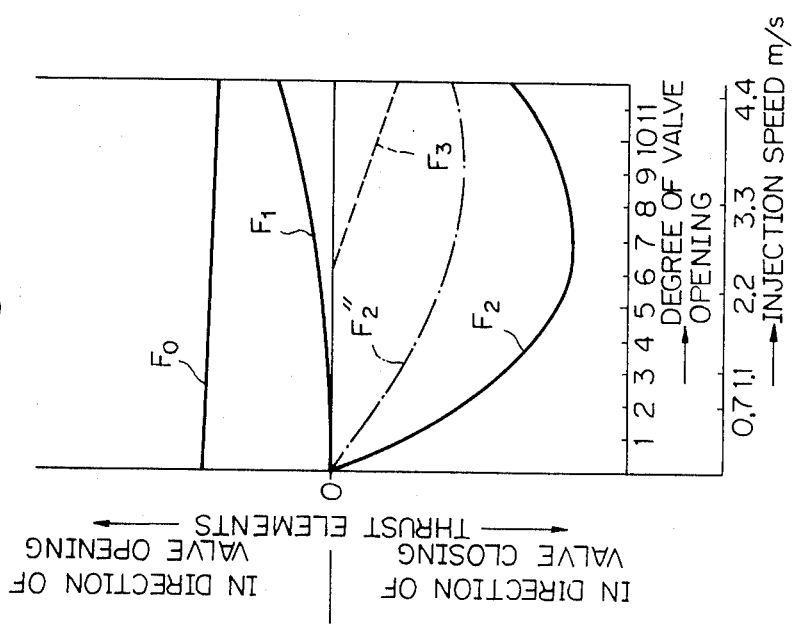
FIG. 3 is a diagram corresponding to FIG. 2 but indicating thrusts of the valve spool, each of which is a combination of the thrust elements as shown in FIG. 2.

A thrust F of the valve spool 60 is a combination of three kinds of thrust elements $F_0$, $F_1$ and $F_2$ (i.e., $F = F_0 + F_1 + F_2$), as indicated by a solid line in FIG. 3, in a case where there is no spring as denoted by 80.

The direction of the thrust F changes from the direction of valve opening to the direction of valve closing, while the degree of valve opening is increased from zero. Such thrust pattern or behavior where the direction is changed, is produced by the following condition:

$$R \geqq 0.15, \text{ preferably } R = 0.15 - 0.4,$$

$$\text{where } R = \frac{\text{Total of cross-sectional areas of the through-holes 61}}{\text{Cross-sectional area of the valve bore 40}}$$

If the above condition is not satisfied (i.e., $R > 0.15$), a thrust F'' as indicated by a dotted line in FIG. 3 is generated, that is, F'' ($F'' = F_0 + F_1 + F_2''$) is in the direction of valve opening. In this case, the thrust element in the direction of valve closing, corresponding to $F_2$ is indicated, for example, by a dotted lien $F_2''$ in FIG. 2.

Turning to the spring 80, if it is provided as shown in FIG. 1, a thrust F' is generated, as indicated by a dotted line in FIG. 3. F' is a combination of $F_0$, $F_1$, $F_2$ and $F_3$ ($F' = F_0 + F_1 + F_2 + F_3$), where $F_3$ is another thrust element generated by the spring 80. In the prepared embodiment, the spring 80 is designed so as to produce the thrust element $F_3$ as indicated in FIG. 2, that is, so as to exert a resilient force against the valve spool 60 in the direction of valve closing as the degree of valve opening is increased from the specific degree where F is maximum in the direction of valve closing, so that F' is the same as F in the region from zero to the specific degree and F' is constant at the maximum value of F in the subsequent higher region.

In general, a die casting machine is operated with a lower injection speed at a level of 0.3 m/s and a higher injection speed at a level of 2.5 m/s with the highest injection speed at a level of 5 m/s. The embodiment of the valve is designed along the line above. The injection speed is indicated in FIG. 2 and FIG. 3 in correspondence with the degree of valve opening.

According to the valve exhibiting the thrust pattern with F'' as indicated by the dotted line in FIG. 3, the thrust F'' is the direction of valve opening always acts on the valve spool 60 at any position thereof. In this connection, when an accident occurs where the valve loses the ability to control the position of the valve spool 60 for some reason, the valve spool 60 is forced to continuously move in the direction of valve opening by the thrust with result that the flow rate of the oil is abnormally increased. Such a case is very dangerous to the die casting machine and the operator involved.

In marked contrast, according to the valve exhibiting the thrust pattern with F as indicated by the solid line in FIG. 3, in such an abnormal case, the valve spool is forced to return to a position where the thrust is zero by the thrust acting on the valve spool 60 in the direction of valve closing. Therefore, the flow rate of the oil is not only prevented from being increased but also is decreased considerably. This enhances the safety performance of the machine with the valve incorporated therein.

The valve exhibiting the thrust pattern with F' as indicated partially by the solid line and partially by the dotted line in FIG. 3 is more preferable in ensuring high safety performance. This is because even if the maximum injection speed to be used in operation is increased, the thrust F' is ensured to be in the direction of valve closing. Therefore, the valve spool 60 is assuredly forced to return to a position in the low injection speed range.

Incidentally, in a case where an injection speed in the lower speed range, for example 0.3 m/sec, there is no risk, even if such an abnormal accident occurs. This is because the valve spool is forced to move in the direction of valve opening, but stops at the position corresponding to about 0.7 m/sec, which is still in the low speed range. In that position, the thrust F or F' is substantially zero.

In this regard, it is preferable to design the thrust pattern so that the position where the thrust is zero is in the low injection speed range or is a higher level somehow over the low speed range.

As shown in FIG. 3, it is preferable in practice that $F_A$ at about 0.3 m/s be designed so as to be the same in absolute value with $F_B$ at about 2.5 m/s in practical operation.

It is not easy to design a valve which exhibits the exact desired thrust pattern in actual operation. The desired thrust pattern features as follows:

1. The thrust is relatively large in the direction of valve opening when the valve is closed.
2. The direction of the thrust changes from that of valve opening to that of valve closing at a higher limit of the low injection speed range.
3. The thrust in the direction of valve closing is in the high injection speed range to be used, while its absolute value is relatively small.

In this regard, the condition R may be adjusted by applying a disk 65 to the valve spool machined with the through-holes 61 having a predetermined diameter d, as shown in FIG. 4. Disks having various diameters may be used to seek and determine the desired condition of R. The best disk 65 is coaxially mounted in use, with a screw 66 to the front face of the valve spool 60 facing the front chamber 41 so that it partially covers the through-holes 61. In this case, the total of cross-sectional areas of the through-holes in the formula R is a total of the portions of the cross-sectional areas of the through-holes, which portions are uncovered by the disk 65. According to a preferable design of the valve, the following conditions are further satisfied under the condition of R as mentioned above.

$$\frac{\text{Diameter of the cylindrical rod 70}}{\text{Outer diameter of the valve spool 60}} = 0.1\text{--}0.22 \quad \text{(i)}$$

Number of the through-holes = 6–10  (ii)

$$\frac{\text{Diameter of the through-holes located the closest ot the periphery of the valve spool 60 at the front end thereof}}{\text{Outer diameter of the valve spool 60}} = 0.77\text{--}0.93 \quad \text{(iii)}$$

Referring to FIG. 1, $l_1$ represents an overlapping gap in axial length between the front edge of the valve spool 60 and the front edge of the front flow channel 32, while $l_2$ represents a corresponding overlapping gap in axial length between the rear edge of the circumferential groove 62 and the front edge of the rear flow channel 33, at an axial position of the valve spool 60 relative to the valve body 10 or the valve bore 40.

According to the present invention, $l_1 \geq l_2$. If $l_1 < l_2$ at the initial stage of the valve spool movement starting from the closed position of the valve, the front flow channel 32 opens some time before the rear flow channel 33 opens. This means that the valve is equivalent to that provided with no flow channel means other than the front flow channel at the initial stage of valve operation.

In the case of $l_1 \geq l_2$, the maximum value of the thrust element $F_2$ (in the direction of valve closing) is increased as $l_1$ relative to $l_2$ is decreased. When $l_1 = l_2$, the maximum value of $F_2$ is maximized. In this connection, the degree of valve opening where the thrust F or F' is zero is shifted toward the zero degree of valve opening (i.e., toward the left in FIG. 3) as $l_1$ relative to $l_2$ is decreased, and reaches a degree closest to the zero degree when $l_1 = l_2$. Under the circumstances, a specific $l_1$ relative to $l_2$ must be determined in consideration of the above relationship and the other conditions mentioned above to produce a desired thrust pattern or behavior.

What is claimed:

1. In a spool-type adjusting valve comprising:
   a valve body having a flow inlet and a flow outlet for transferring a pressurized fluid within said valve:
   a valve bore formed within said valve body to communicate with said flow inlet and said flow outlet and having a first and a second chamber at opposite ends of said valve bore, said flow inlet being connected to said first chamber:
   a valve spool slidably positioned within said valve bore and maintaining frictional engagement therewith, said valve spool having a cylindrical rod for slidably positioning said valve spool along the axis of said rod between said first and said second chambers, the surface area of said valve spool facing said first chamber being greater than the surface area of said valve spool facing said second chamber, the opening and closing of said flow outlet being dependent upon the reciprocating movement of said valve spool within said valve bore;
   at least one flow passage formed within said valve spool for interconnecting said first and second chambers, said flow passage being defined by an axial through-hole formed along the length of said valve spool, wherein the flow of the fluid passing between said flow inlet and said flow outlet increases as said valve spool moves in the direction of said second chamber and opens said flow outlet;
   a circumferential groove between the outer surface of said valve spool adjacent said valve bore and said flow passage for allowing the fluid to flow from said flow passage and into said flow outlet when said groove is aligned with said flow outlet, and wherein said flow outlet includes first and second channels extending substantially perpendicular to the axis of the valve spool, said first channel being in fluid communication with said first chamber and said second channel for fluid communication with said flow outlet when said groove is aligned with said second channel; and
   means for slidably positioning said cylindrical rod includes:
   a housing mounted adjacent said second chamber of said valve bore, the adjacent surfaces of second chamber and said housing having shaft receiving means coaxially aligned with said cylindrical rod;
   a connecting shaft slidably supported within said shaft receiving means and having a rod portion and a cylindrical portion, said rod portion being connected to said valve spool via said cylindrical rod;

motor means including a pulse motor and having a driving member and a driven member mounted within said housing for imparting rotational movement within said housing;

conversion means connecting said cylindrical portion of the connecting shaft to said driven member for transforming rotational movement into reciprocating movement, said conversion means including a nut attached to said cylindrical portion, a drive screw shaft connected to said driven member for rotation within said nut, balls rotatably positioned between said nut and said screw shaft, and means for preventing said nut from rotating relative to said housing, the improvement in that the ratio of cross-sectional areas of said flow passages in total at the end of said valve spool facing said first chamber to the cross-sectional area of said valve spool is set to a special value large enough to have a thrust acting upon said valve spool in the direction of valve opening decreased as the degree of valve opening is increased from zero and have a direction of the thrust changed at a specific degree from the valve opening direction to the valve closing direction, wherein, when said valve spool is free from control for positioning said valve spool at a degree of valve opening over the specific degree in operation, said valve spool is forced to return to the specific degree by the resultant thrust in the valve closing direction.

2. A flow adjusting valve as claimed in claim 1, wherein there are a first overlapping gap in axial length between the edge of said valve spool facing said first chamber and the edge of said first channel located at the side of said first chamber and a second overlapping gap in axial length between the edge of said groove located at the side of said second chamber and the edge of said second channel located at the side of said first chamber, at an axial position of said valve spool relative to said valve bore, the first gap being not less than the second gap.

3. A flow adjusting valve as claimed in claim 2, wherein the ratio is in the range from 0.15 to 0.4.

4. A flow adjusting valve as claimed in claim 3, further including means for biasing said valve spool to exert a force as an additional element of the thrust in the direction of valve closing against said valve spool, wherein the bias force is increased from zero as the degree of valve opening is increased from a second specific degree.

5. A flow adjusting valve as claimed in claim 4, wherein the second specific degree is the degree where the thrust of said valve spool excluding the bias force is maximum in the direction of valve closing.

6. A flow adjusting valve as claimed in claim 5, wherein the thrust including the bias force is substantially constant at a degree of valve opening ranging from the second specific degree to a larger degree.

7. A flow adjusting valve as claimed in any one of claims 1 to 6, further including a disk mounted coaxially to said valve spool at the end thereof facing said first chamber, wherein said disk covers partially said flow passages.

8. A flow adjusting valve as claimed in claim 6 wherein said biasing means is provided within said second chamber.

9. A flow adjusting means as claimed in claim 6 wherein said biasing means is provided in said housing.

10. A flow adjusting valve as claimed in claim 5 wherein said biasing means is provided within said second chamber.

11. A flow adjusting valve as claimed in claim 5 wherein said biasing means is provided in said housing.

12. A flow adjusting valve as claimed in claim 4, wherein said biasing means is provided within said second chamber.

13. A flow adjusting valve as claimed in claim 4, wherein said biasing means is provided in said housing.

14. A flow adjusting valve of claims 4, 5 or 6 further including a disk mounted coaxially to said valve spool at the end thereof facing said first chamber, wherein said disk covers partially said flow passage and wherein said biasing means is provided in said second chamber.

15. A flow adjusting valve of claims 4, 5 or 6 further including a disk mounted coaxially to said valve spool at the end thereof facing said first chamber, wherein the said disk covers partially said flow passage and wherein said biasing means is provided in said housing.

* * * * *